United States Patent [19]

Stetz

[11] Patent Number: 5,040,716
[45] Date of Patent: Aug. 20, 1991

[54] PIPE WELDING APPARATUS

[75] Inventor: William Stetz, Oostburg, Wis.

[73] Assignee: Aqua-Chem, Inc., Milwaukee, Wis.

[21] Appl. No.: 503,867

[22] Filed: Apr. 3, 1990

[51] Int. Cl.$^5$ ............................................. B23K 37/053
[52] U.S. Cl. ........................................ 228/49.3; 228/42;
   228/56.5; 269/51; 269/95; 269/311
[58] Field of Search ................... 228/49.3, 56.5, 42,
   228/44.5, 212; 269/9, 50, 51, 95, 311, 902

[56] References Cited

U.S. PATENT DOCUMENTS

| | | | |
|---|---|---|---|
| 3,596,898 | 8/1971 | Hilburn | 269/243 |
| 3,653,574 | 4/1972 | Dearman | 228/49 |
| 3,827,126 | 8/1974 | Shiozawa et al. | 228/49.3 |
| 3,870,288 | 3/1975 | McLarnon | 269/71 |
| 3,881,715 | 5/1975 | Ellis | 269/49 |
| 3,901,497 | 8/1975 | Dearman | 269/37 |
| 3,944,202 | 3/1976 | Dearman | 269/130 |
| 4,338,712 | 7/1982 | Dearman | 29/281.6 |
| 4,356,615 | 11/1982 | Dearman | 29/525 |
| 4,405,075 | 9/1983 | Roddy | 228/49 |
| 4,463,938 | 8/1984 | Dearman | 228/49.3 |
| 4,570,842 | 2/1986 | Gregorious et al. | 269/37 |
| 4,623,085 | 11/1986 | Dearman | 228/49.3 |

FOREIGN PATENT DOCUMENTS

| | | | |
|---|---|---|---|
| 46651 | 11/1972 | Japan | 228/49.3 |
| 1292966 | 2/1987 | U.S.S.R. | 228/49.3 |

Primary Examiner—Samuel M. Heinrich
Attorney, Agent, or Firm—Arnold J. Ericsen; C. Thomas Sylke

[57] ABSTRACT

An apparatus for aligning and supporting confronting pipe or tube sections to be welded together. An elongated supporting table is provided with a pair of inwardly grooved tracks and various pipe secondary support members are also provided to mate with the tracks and to hold several pipe or tube arrangements utilizing conventional T-fittings, 45° and 90° elbow fittings, nozzle fittings, etc. The apparatus permits minimal setup time, proper alignment, stability during welding and the use of conventional orbital pipe welding heads and a smooth angular welding surface free from interference by prior art longitudinally disposed clamping external members.

22 Claims, 8 Drawing Sheets

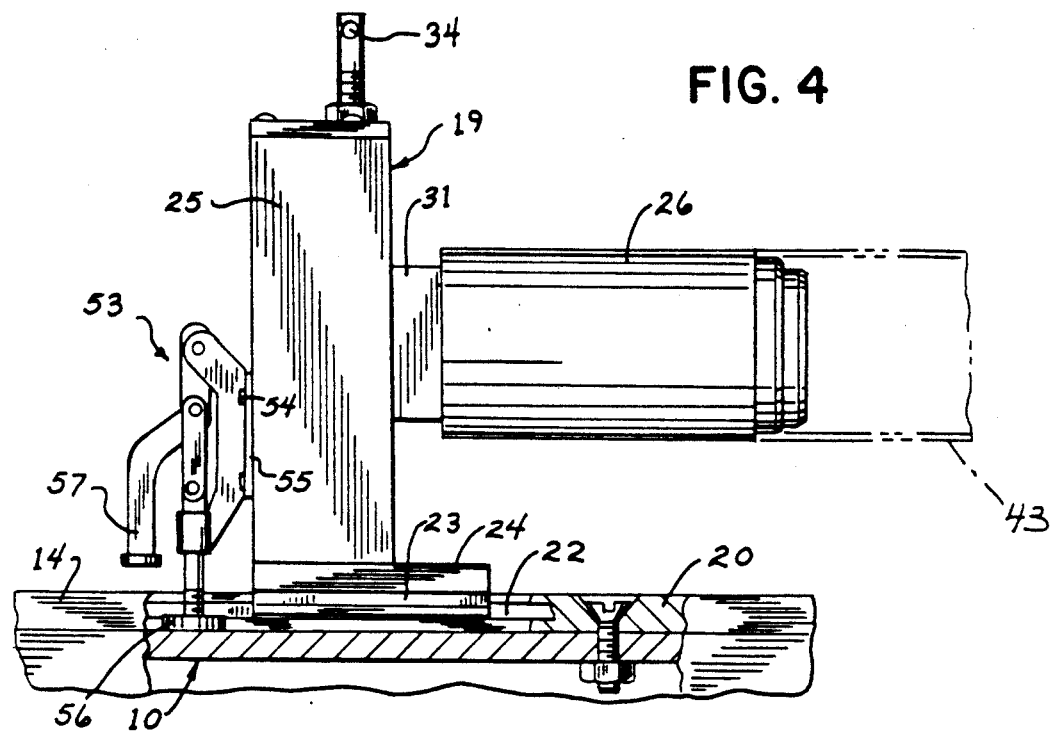
FIG. 4
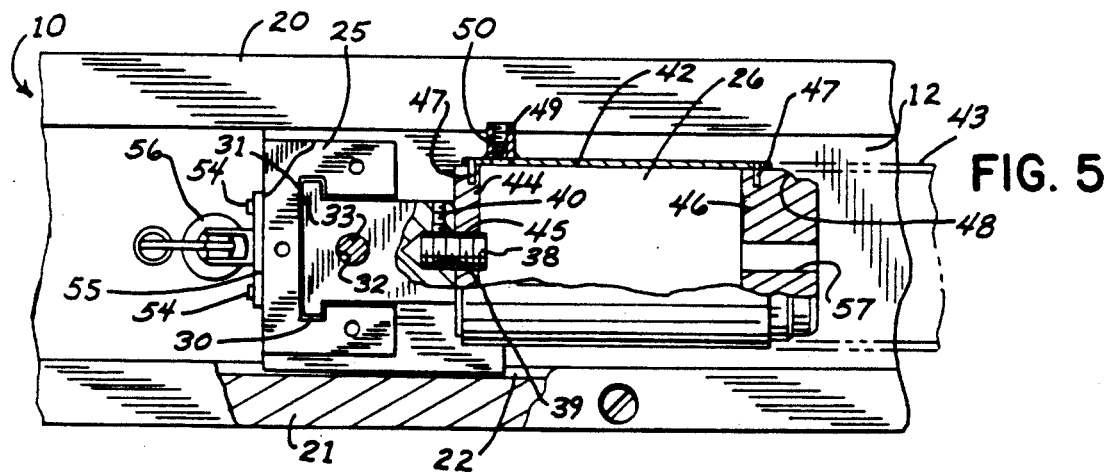
FIG. 5
FIG. 6

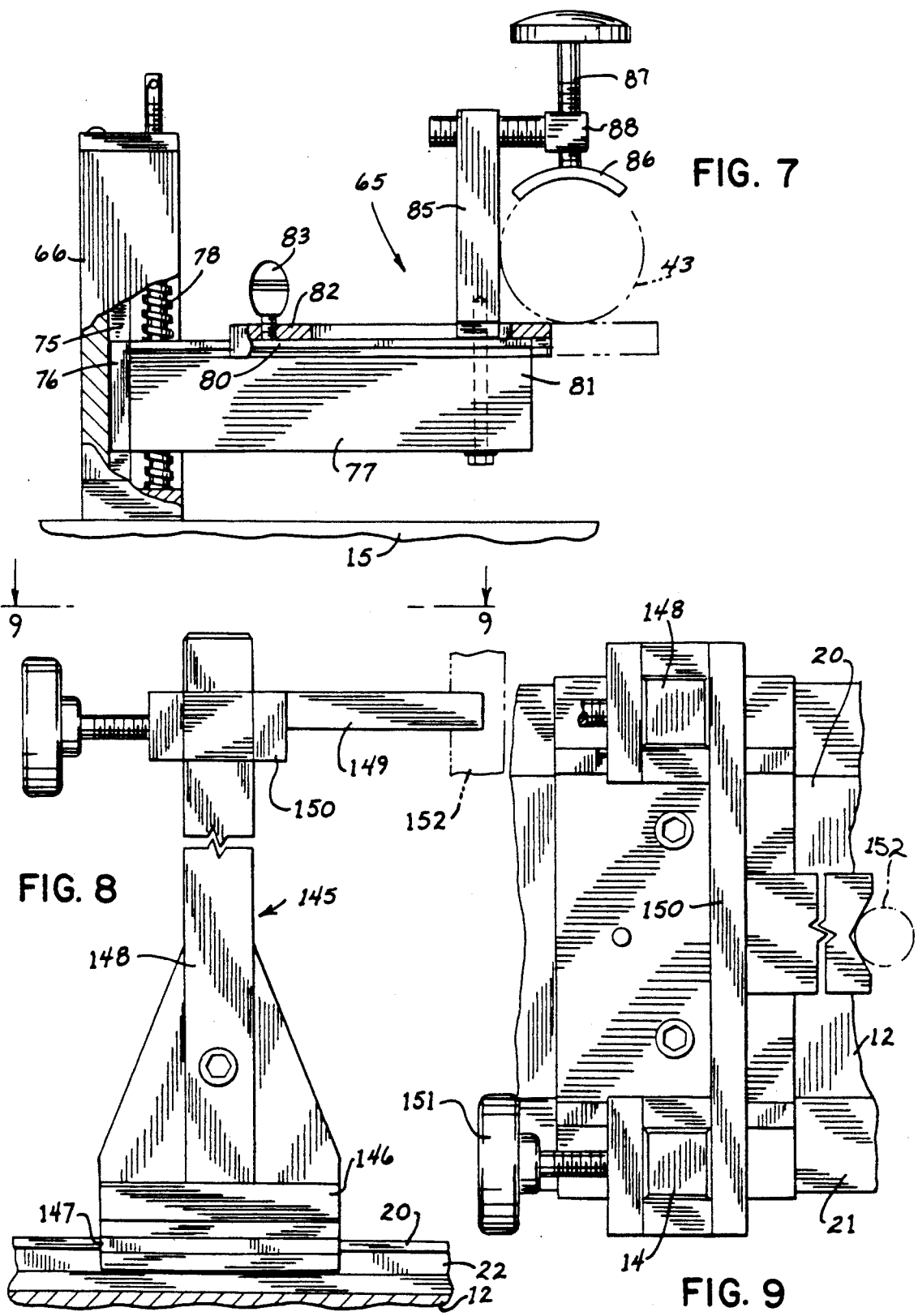

PIPE WELDING APPARATUS

BACKGROUND OF THE INVENTION

1. Field of Invention

An apparatus for aligning and supporting pipe or other tubular members during assembly and welding of confronting ends of the tubular members.

2. Description of the Prior Art

In the assembly of pipe and tubes, and in particular the assembly of sections of pipe and tube to elbows and tee fittings, one of the most important requirements for an acceptable product is proper finish, overall dimensions and true angular relationships between the abutting members to be welded. Prior art methods, fixtures and apparatuses required squares, leveling devices and clamping of the parts, together with tension bars that traversed the plane of weldment, in order to align and prevent movement due to expansion and shrinkage during the welding process. Prior art methods of assembly were also very time-consuming. It is estimated that approximately 75% of the time was devoted to set-up with 25% being devoted to actual welding time. In addition, a finish check for dimensional accuracy required manually held tape measure readings.

Further, secondary parts, such as couplings, nipples and gauge parts required application particular to the axial centerline of the pipe or tube by means of a combination square and sightglass level bars. Obviously, this allowed for considerable human error and was very time-consuming.

Various prior art aligning and clamping devices are exemplified by several U.S. patents. These include clamping chains, as shown in the Creek U.S. Pat. No. 3,881,715. It will be appreciated that chain grips are adjustable for pipes of varying diameter. However, these fixtures still require additional precise aligning techniques and, in the case of very accurate alignment, other auxiliary devices must be used for leveling and squaring of confronting tubular members.

Two U.S. patent references disclose clamping means for internally supporting adjoining members to be welded. Patent disclosures teach the provision of an unobstructed path for use with welding machines, but are relatively complex to assemble and do not provide the structural support required for accuracy in welding techniques. The Dearman U.S. Pat. No. 4,463,938 has particular application in field welding of relatively large pipe members and provides expandable internal clamping members for retaining each of the confronting pipes in alignment during welding. The Roddy U.S. Pat. No. 4,405,075 discloses a fixture with an expandable section positioned opposite the junction of two pipe ends to be welded. Although this provides rigid axial alignment for welding, there is no disclosure of an external support for the joined and retained members.

Other examples of clamping fixtures are illustrated in several patents granted to Timothy C. Dearman; namely, U.S. Pat. Nos. 3,653,574; 3,901,497; 3,944,202; 4,338,712; 4,356,615 and 4,623,085. Although the various Dearman clamping devices provide means for retaining pipe sections in confronting relationships, most of the clamping devices disclosed elongated bars which traverse the junction of the pipe members to be welded. This is satisfactory for manual welding, but it will be apparent that interference will be met with encircling welding machines utilizing orbital pipe or tube welding heads.

A further reference of interest is the Hilburn U.S. Pat. No. 3,596,898, which discloses a fixture for retaining the ends of tube pipe sections, wherein the fixture includes an upper and lower clamp again, extending across the junction to be welded.

SUMMARY OF THE INVENTION

It is a principal object of the present invention to provide apparatus for aligning and supporting confronting pipe or tube sections to be welded together. The apparatus may take the form of a generally "T" shaped table providing a supporting base to which is mounted a slide track system for slideably supporting horizontally adjustable end support members. The end support members preferably include components permitting vertical adjustment and cantilevered support of a laterally extending mandrel aligned for parallel movement relative to the slide track. The end support member includes means for slideably engaging the track, and may take a preferred shape of a "tongue and groove" relationship with the track. The vertical adjustment may be in the form of a relatively stationary upright having a tee-slot coextensive of its length and receiving a tongue or detent extending laterally from opposite sides of a mandrel supporting member. Thus, the mandrel and a supported pipe or tubular member may be raised and lowered by means of a manual adjusting screw or other means of height adjustment. The cantilevered mandrel may be removably secured at one end to the vertically moveable mandrel support member to permit substitution of supplementary or auxiliary tube or pipe supporting devices.

Other supplementary or auxiliary fixture members are contemplated for use with the system for assembling and joining tubular units forming several assembly variations, including 90° tees, 45° elbows, 90° elbows, spray headers, T-type manifold units, transition sections for changing diameter of adjoining tubular members and other auxiliary arrangements. The present apparatus or fixture is ideally suitable for use with gas back-up welding techniques having gas line connections on the mandrel body. The mandrel end hole allows argon gas to flow into pipes during welding creating a "gas back-up" condition.

BRIEF DESCRIPTION OF THE DRAWINGS

FIG. 4 is a front elevational view of an end support fixture including a cantilevered mandrel, and partially in section to illustrate the sliding horizontal support means and clamping means for said in support member and mandrel;

FIG. 5 is a top plan view of the assembly of FIG. 4, partially in section, and illustrating the details of the mandrel, the T-slot in an upright member of the end support member and means for vertical adjustment of the components;

FIG. 6 is a fragmentary top plan view, taken along lines 6—6 of FIG. 1, illustrating operating components of a supplementary elbow holder fixture;

FIG. 7 is a fragmentary elevational view, partially in section, taken along line 7—7 of FIG. 6 and further illustrating the supplementary elbow holding fixture of FIG. 6 in front elevation;

FIGS. 8 and 9 are front elevational and top plane views, respectively, of a supplementary fixture having particular application in alignment in a perpendicular plane of a nozzle of lesser diameter than that of a conventional pipe or tubes to which it is to be welded.

DESCRIPTION OF A PREFERRED EMBODIMENT

Figure 1:
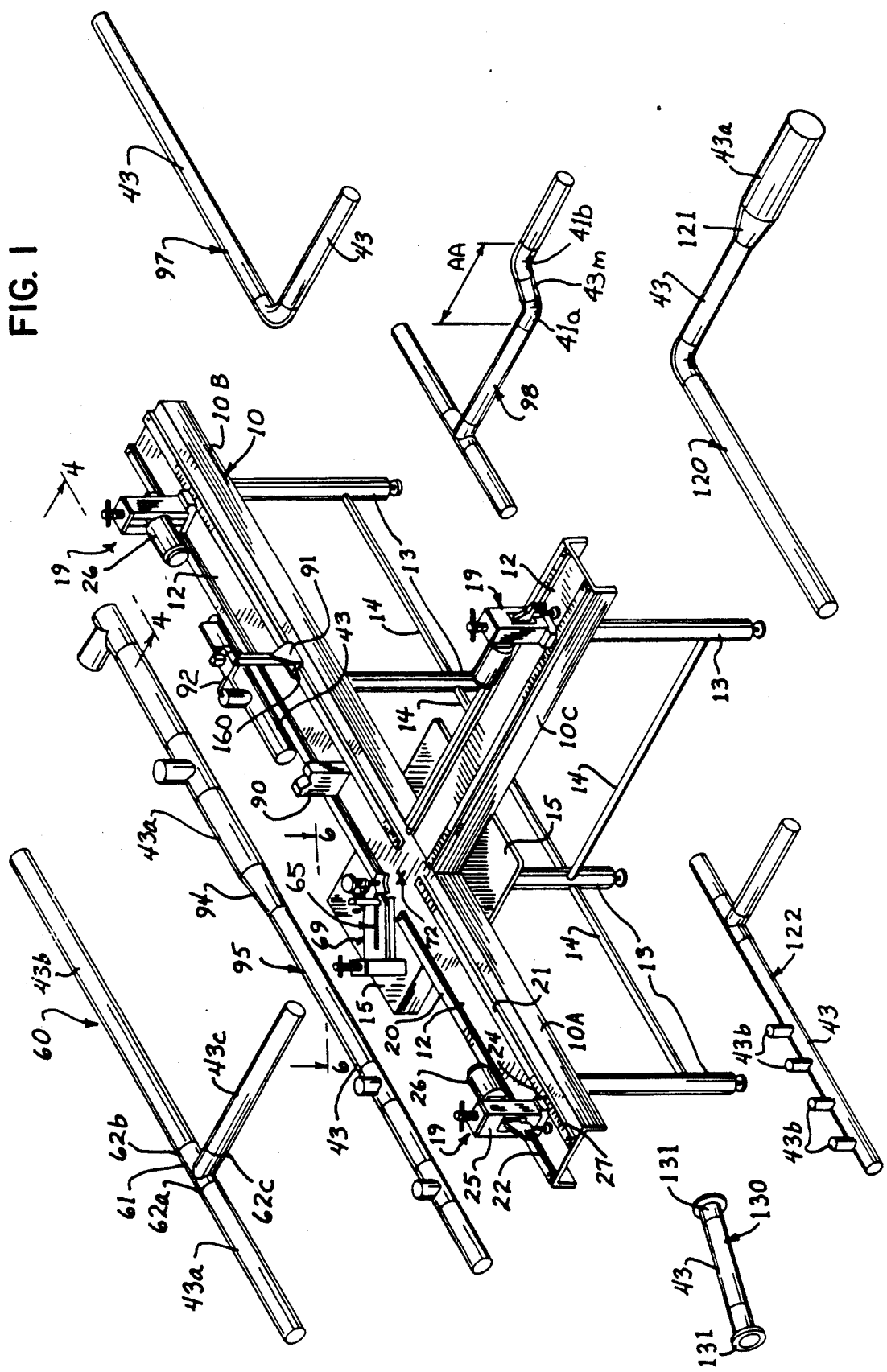
FIG. 1 is a perspective view illustrating a T-shaped table made in accordance with this invention and providing a stationary supporting base for pipe or tube end support members and other supplementary support fixtures adapted to support pipe or tubular members in various configured arrangements; and with FIG. 1 further illustrating, in exploded view, several varieties of arrangements which may be readily aligned and supported by the apparatus of this invention.

With reference to FIG. 1, it will be observed that this embodiment includes a T-shaped table indicated generally by the reference numeral 10. As disclosed, the supporting table 10 includes three table extensions, 10A, 10B, and a central table extension 10C lying in a plane normal to the plane of extensions 10A and 10B. It is contemplated, for some installations, that a fourth table extension (not shown) may be used and extending from the side opposite 10C extension. Extensions 10A, B and C are preferably formed of an inverted U-shaped channel providing a planar stationary supporting base surface 12. The table or frame 10 also includes a plurality of legs 13 joined at opposite ends to respective stretchers 14. An auxiliary table 15 is disposed at the junction of the legs 10A, B and C to provide an auxiliary support for supplementary fixture units, as will hereinafter be described. FIG. 1 further includes exploded views of various conventional arrangements 60, 95, 97, 98, 120, 122 130 of pipe or tube configurations, which may be readily aligned and supported by the various fixtures secured to the table 10.

Figure 2:
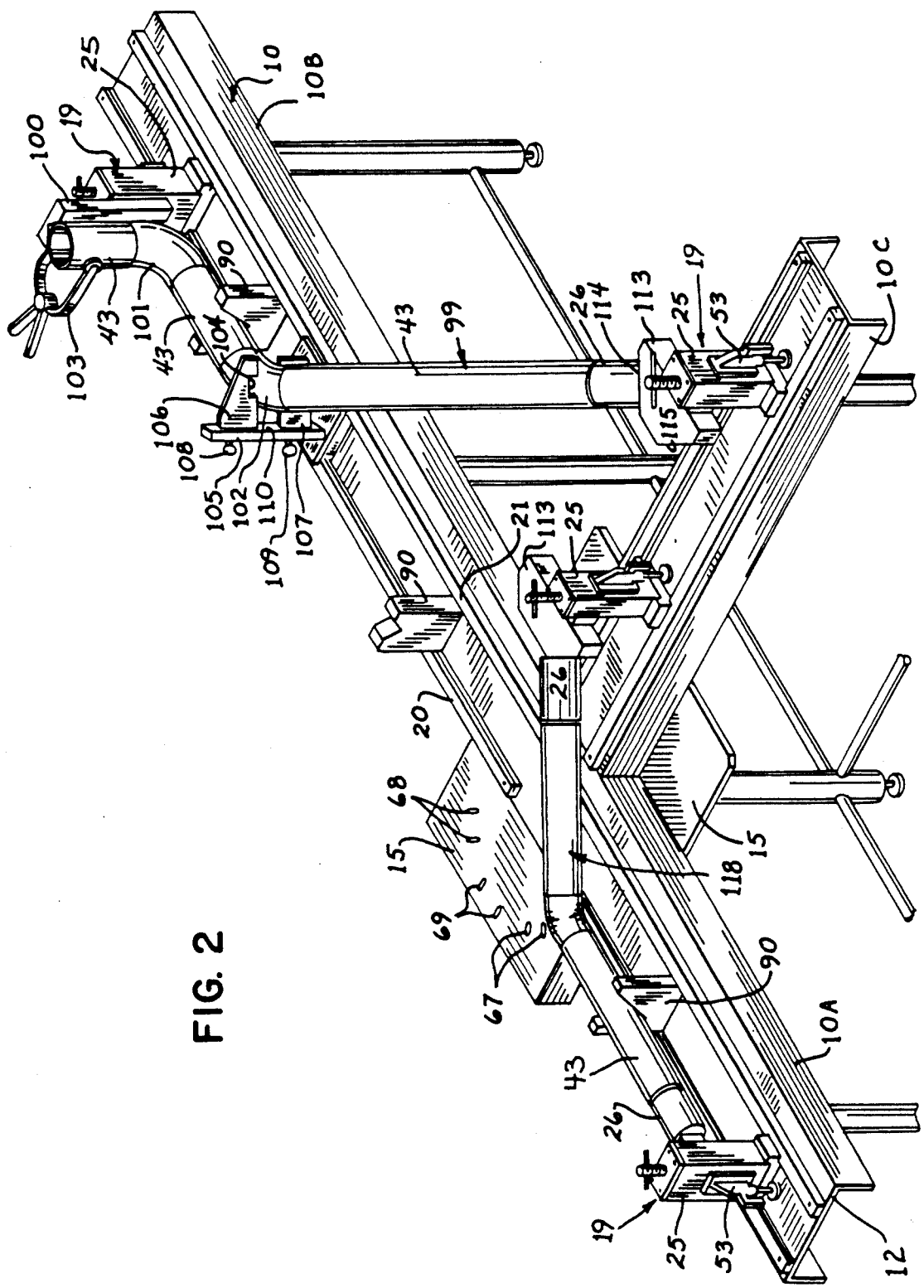
FIG. 2 is a perspective view of the apparatus of this invention, illustrating various supplementary fixtures which may be added to align and support various arrangements of pipes or tubes and supported by the table 10 of FIG. 1.

Again, with reference to FIGS. 1 and 2, the cantilevered mandrels 26, located at the free ends of the respective table extensions 10A and 10B, are provided to receive and support a free end of a pipe or other tubular member 43. The relationship between the tubular member 43 and its end supporting mandrel 26 is more clearly shown in the views of FIGS. 4 and 5. The respective mandrels 26 and their form and function are detailed with respect to the views of FIGS. 4 and 5.

It will be observed that the end support member 19 includes an upright or column 25 secured to a base 24. The table surface 12 supports parallel tracks 20 and 21, each being provided with a longitudinal groove 22 arranged to receive a laterally extending tongues 23. As required, the mandrel end support member 19 may be inserted at either end of the tracks 20 and 21 and into their respective grooves 22. The present invention contemplates the use of a ruler 27 engraved or otherwise displayed on the track 21 (see FIGS. 1 and 13). Likewise, the base 24 may include an engraved pointer (not shown), or conveniently, the edge of the base 24 may be used with the ruler 27 to ensure desired placement of the end support member 19 with respect to the table 10, as will be hereinafter discussed. As detailed in FIGS. 4 and 5, the upright 25 contains a T-slot 30 for slideable retention of a mandrel base member 31. The mandrel base member 31 is provided with a threaded aperture 32 arranged to receive a conventional acme threaded screw 33. Manually adjustable means, which may be in the form of any conventional laterally protruding handles, circular knobs, or in the present case, a laterally extending pin 34, when rotated, either raises or lowers the mandrel base member 31 to the desired vertical alignment position. The cantilevered mandrel 26 is removable and is supported at its inner end by means of a threaded stud 38 engaging a threaded re-entrant opening 39 in the base member 31. The threaded stud 38 is further retained within the threaded opening of the mandrel base member 31 by means of a set screw 40. The mandrel may be unscrewed for replacement with mandrels of varying diameter or other supplementary devices, as will hereinafter be discussed.

The mandrel 26, as disclosed in section in FIG. 5, preferably comprises a tubular sleeve 42 which may be a length of pipe or tubing of the same diameter and thickness as that supported from the mandrel 26. Thus, the thickness of the members 42 and 43 will be substantially identical, and will therefore be compatible with other supplementary fixtures utilized in welding operations, as will hereinafter be explained. The sleeve 42 is pinned at 47 at opposite ends to a rear disk 44 including a threaded aperture 45 arranged to receive the threaded stud 38. A forward mandrel closure member 46 is provided at the opposite end of sleeve 42. The pins are disposed at arcurate intervals along the respective peripheries of each of the members 44 and 45.

The forward closure member 45 is provided with at least one annular shoulder 48 to provide a surface of reduced diameter to accommodate the inner diameter of a pipe or tube of relatively lesser internal diameter than the pipe 43. The sleeve 42 may also be provided with an aperture 49 communicating with an internally threaded fitting 50 for receiving a threaded gas supply fitting (not shown) for gas backup welding. The entering gas, such as argon, leaves the mandrel through the aperture 57 in the forward mandrel closure 45 to enter the chamber of the pipe or tubular member 43 for application of conventional gas backup welding procedures.

A clamp, indicated generally by the reference numeral 53, is secured to the upright 25 by means of machine screws 54 seated in openings in the base 55 of the clamp 53 and threadingly received in registering threaded openings in the upright 25. The holding clamp 53 is conventional, and is known in the trade as a DE-STA-CO Model 608 with a 1¼ inch diameter by ¼ inch flexible pad 56. The pad 56 is frictionally engageble with the supporting surface 12 of the table 10. A manually operated handle 57 is supplied for releasing and clamping the pad 56 out of and into engagement with the surface 12. It will be observed that the rearward and upwardly spaced position of the clamp 53 relative to the upright 25 and to the surface 12 provides shear forces which tend to rotate the upright 25 about an imaginary pivot at the base 24 of the upright 25, to thereby apply pressure on the mandrel in an axial direction towards the supported pipe or tube 43. The axial force will wedge the mandrel 26 tightly against the tube or pipe 43 and thereby provide alignment and confronting engagement between mating pipe sections to be welded.

Various examples of tubular configurations which may be conveniently welded while being supported by the table 10 in its supplementary fixtures are illustrated in the exploded portions of FIG. 1. Although not shown, conventional orbital tube welding heads may be conveniently used with the present apparatus. The apparatus provides pipe or tube support fixtures and a stationary support base allowing facile, simple assembly of members in ready welding position with minimal set up time. A typical welding head which may be used is supplied under various model numbers (A1, A2, B2, 5002, 5004) by Dimetrics, Inc. of Diamond Springs, Calif.

A T-arrangement of FIG. 1 is shown at 60, and includes a conventional tee-fitting 61 with welded seams 62a, 62b and 62c joining straight pipe or tube members 43a, 43b and 43c, respectively, to the tee-fitting 61. With reference to FIG. 1, it will be observed that the T-arrangement setup uses auxiliary table 15 supporting a tee-fitting 61 which may be supported by means of an elbow or tee holding fixture 65. The supplementary fixture 65, shown in detail in FIGS. 6 and 7, is provided with means for adjusting both vertical and horizontal movement to accommodate pipe or tubing of various external diameters. A supporting upright member 66 may be bolted to the table 15 by means of removable bolt and nut assemblies received in the table elbow openings 67 or 68, depending on the direction of the elbow to be supported. In the T-arrangement 60, the holder 65 would be positioned in the centrally located aperture 69. The openings 67, 68 and 69 are more clearly shown in FIGS. 2 and 3. Thus, the holder 65 may be located at the three operating positions defined by the openings 67, 68 and 69, to be used with either left or right 45° elbows or the T-arrangement 60. A typical 90-degree elbow arrangement is shown in the combination elbow and transition arrangement 120.

Figure 3:
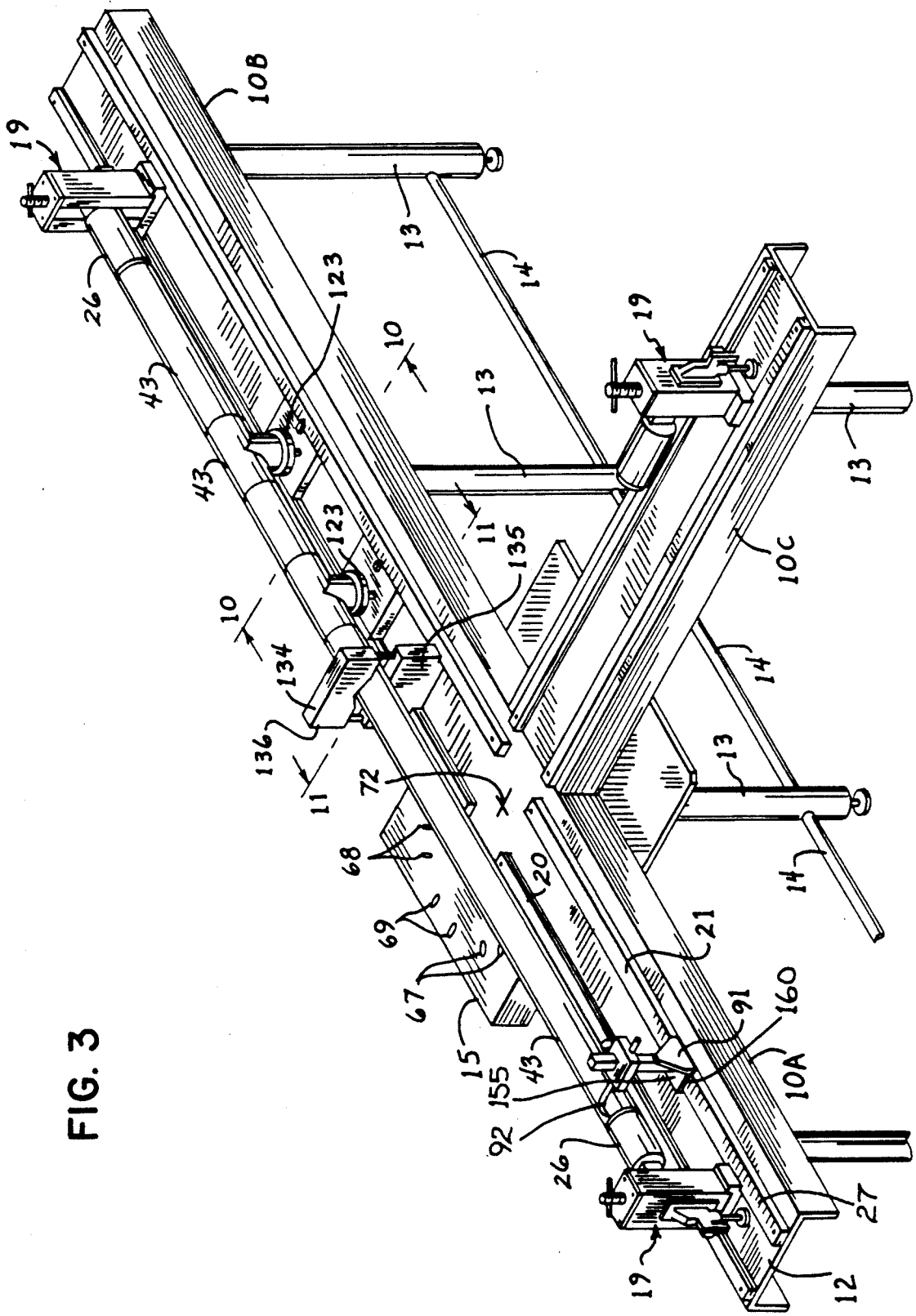
FIG. 3 is a perspective view of the supporting table with additional supplement fixtures, and illustrating still another functional set-up according to this invention.

It is to be noted, with reference to FIGS. 1 and 3, that all measurements are determined from the benchmark cross 72 etched into the surface 12 of table 10 centrally located at the juncture of the table portions 10A, 10B and 10C. The cross 72 provides a convenient means of aligning various pipe and fitting members. The center of the pipe or tubular members may be maintained in alignment on the respective table extensions 10A, 10B and 10C which their respective axes intersecting at the point on cross 72. The fittings, such as T-fitting 61, has its center location at intersecting axes of each of its arms terminating respectively at 61a, 61b and 61c. (See arrangement 60). This permits ready and virtually automatic alignment of adjoining pipes. Measurements may be made with respect to the rulers 27 and the cross 72, since the cross 72 acts as the "zero" value of the respective rulers 27 of the table extensions 10A, 10B and 10C. This is of particular importance in the use of the centerline indicator 91 as will be hereinafter explained.

Returning to the views of FIGS. 6 and 7, the supplementary elbow holder 65 includes a vertical T-slot 75 in the upright 66 (see FIG. 7) for slideably receiving the detents 76 projecting from opposite sides of the cantilevered horizontal support 77. Vertical adjustment is made by means of the acme screw 78 engaging a threaded aperture (not shown) in the horizontal support member 77. This adjustment may be made manually by means of the through pin handle 79 extending laterally from the upper end of the screw 78. The support 77 is provided with laterally extending slot 80 for slideably receiving a longitudinal tongue 81 formed in a horizontal slide 82. The slide 82 may be retained in place relative to the support 77 by means of a thumb screw 83. The slide 82 is also provided with a longitudinal aperture 84, arranged to slideably embrace and accommodate a secondary upright member 85. It will be observed from the phantom lines of FIG. 7 that the slide 82 may be moved horizontally with respect to the horizontal support 77 to act as a lower rest or support for pipes or tubes 43 of varying diameters. The upper end of the pipe 43 is clamped between the extending free end of the slide 82 and an arcuate clamping pad 86. The pad 86 is bored half-way through to receive and seat the lower end of an adjustment hand screw 87 threaded to a threaded stud 88, which is horizontally adjustably engageable with the upper end of the secondary upright 85.

With reference to FIG. 1, V-blocks 90 are shown positioned for supporting an extended length pipe or tubular member 43. A dimension or centerline indicator 91 is also provided and arranged to ride in the slots 22 of tracks 20 and 21. A "feeler" 92 may be raised to a desirable marking position for ensuring correct height of the pipe members 43 to be joined. The rule 27 is also useful in determining correct longitudinal relationship of the indicator 91 with respect to the zero point intersection cross 72 on table surface 12.

Figure 13:
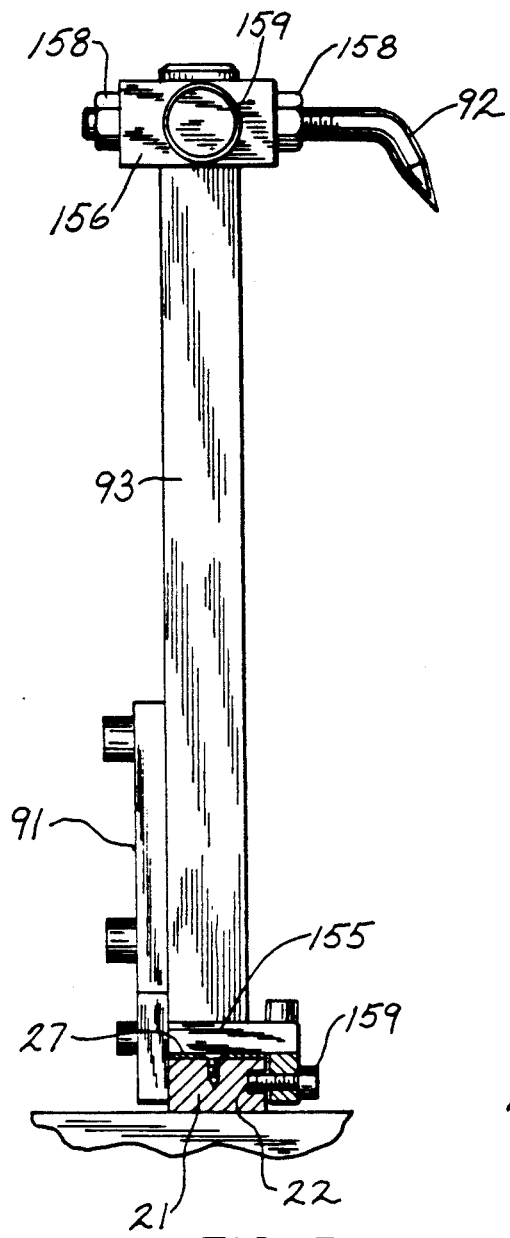
FIG. 13 is a side elevational view, partially in fragment, of a centerline indicator assembly to the supporting table which may be used for accuracy in alignment of confronting tubular members, and particularly transmitting length of pipe from centerline intersection point to ruler on top of tracks.
Figure 14:
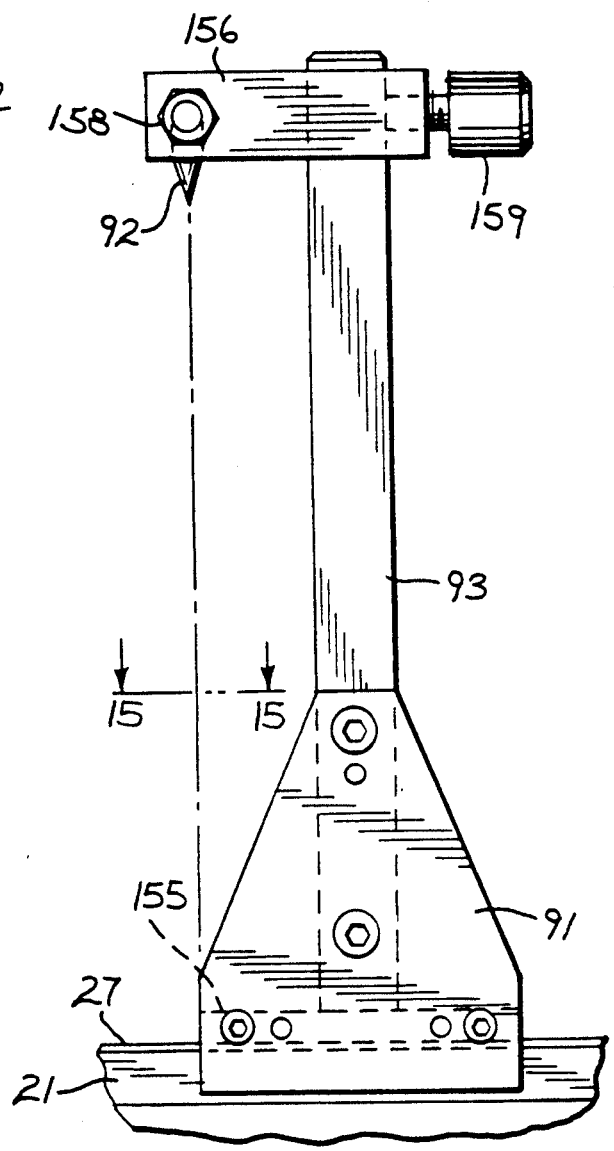
FIG. 14 is a front elevational view of the centerline indicator of FIG. 13.
Figure 15:
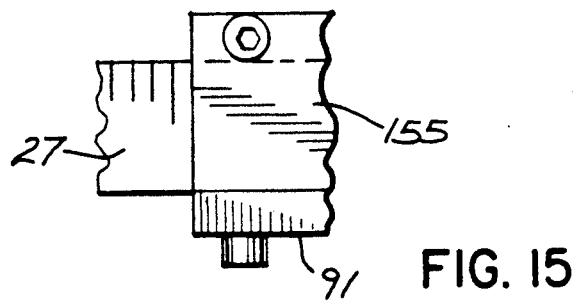
FIG. 15 is a fragmentary sectional view taken along lines 15—15 of FIG. 14.

The centerline indicator 91 is illustrated in detail, and with respect to the table 10, in the elevational views of FIGS. 13, 14 and 15. As will be observed, the indicator 91 includes a vertically and horizontally adjustable pointer or feeler 92 slideably supported on an upright or column 93, preferably of a rectangular cross-section. The column 93 is provided with a supporting base 155, a U-shaped, cross-section and adapted to be slideable with respect to track 21. It may be secured at a selected position by means of a thumb screw threading engageable with the inner leg portion of the base 155 and the slot 22 of track 21.

The feeler 92 extends from a supporting block 156 and is slideably received by a through opening 157. The pointer or feeler 92 includes a threaded portion engageable with adjusting and securing nuts 158 positioned at opposite sides of the block 156. A thumb screw 159 thereby engages a side opening in the block 156 and provides a releaseable locking means for vertical positioning of the pointer 92 with respect to the column 93. It is also to be noted from the view of FIGS. 14 and 15 that the tip of the pointer 92 is in vertical alignment with the left vertical edge of the base 1SS. The left edge and the tip act to provide accurate measurement from the cross 72, which is the zero point of the respective rulers 27 mounted on the respective table extensions 10A, 10B and 10C.

It will be apparent from the foregoing description that the indicator may be used to ensure accuracy in vertical and horizontal location of confronting pipe and/or pipe fittings of varying sizes and positions, as, for instance, in positioning of confronting members of arrangements 92 and 95 illustrated in FIG. 1. The indicator 91 works in conjunction with the ruler 27 fitted to track 21. The edge 160 (See FIGS. 1 and 3) of the base 155 of column 93 may be used to read the appropriate setting with respect to indicia on ruler 27. Obviously, other means of locating this indicator 91 may be used, such as using the opposite edge of the base 155 or by a pointer (not shown) engraved in the fronting surface of the base 155.

As shown in FIG. 1, the series of pipe and tube arrangements include a transition arrangement 95, which also includes several T-fittings. A transitional fitting 94 is used to join a pipe section 43 to a pipe section 43A of greater diameter. This may be conveniently accommodated by using a mandrel 96 of stepped internal diameters, such as that disclosed in the view of FIG. 12. The female mandrel 96 may be substituted for the previously described mandrel 26 (FIGS. 4 and 5) by means of the threaded stud 38, engageable with the threaded aperture 39 in the mandrel base member 31.

A 90° elbow fitting arrangement is shown at 97 (FIG. 1). This piping arrangement may be supported by positioning the holder 65 in the left-hand apertures 67 of the auxiliary table 15, with the free ends of the pipe or tubular members 43 being retained in the mandrels 26 seated in the table portions 10B and 10C, respectively. One or more V-blocks 90 would be used for additional vertical support.

Figure 1A:
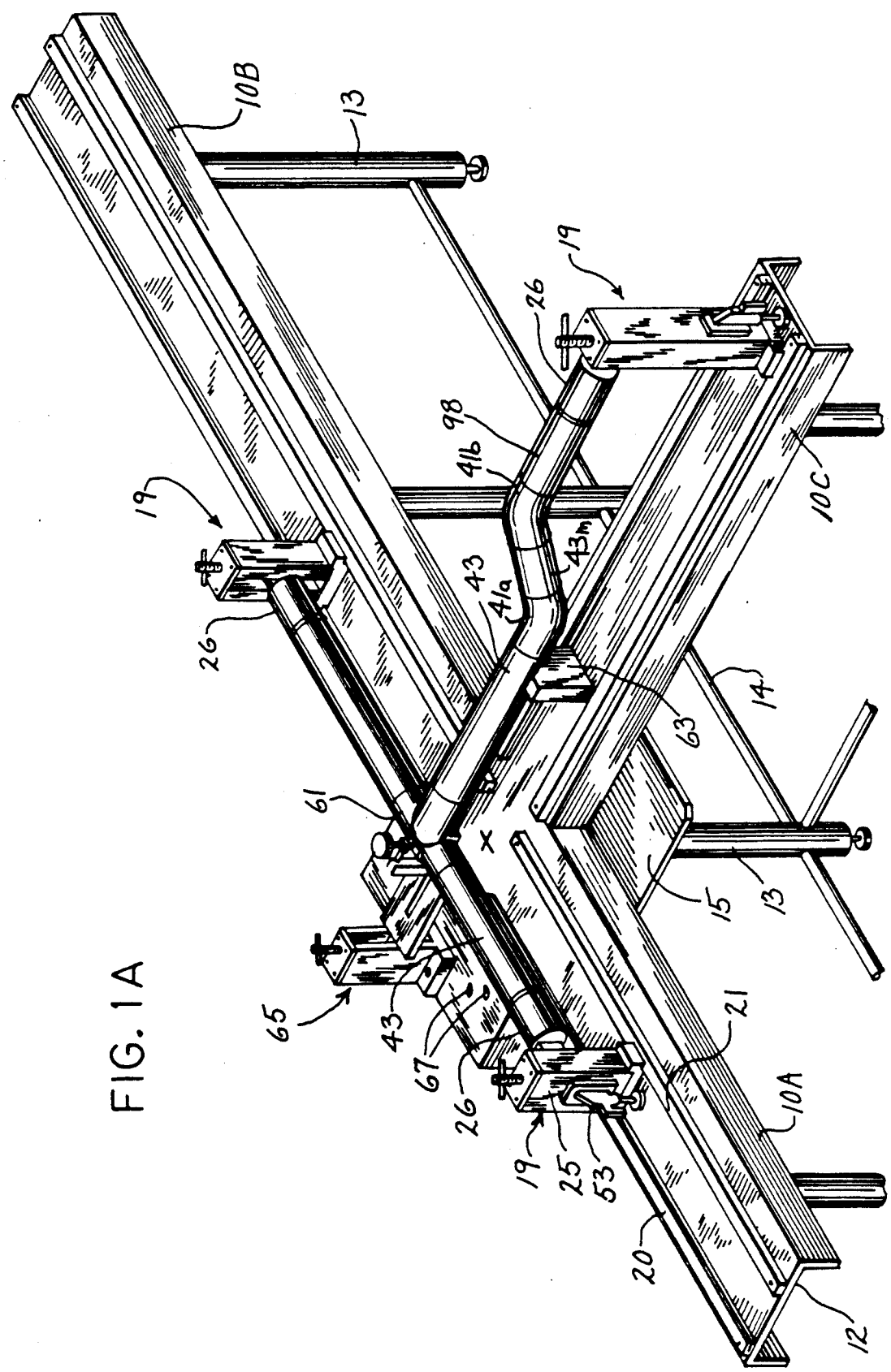
FIG. 1A is a detailed, fragmentary, perspective view illustrating an offset T-arrangement positioned on the T-shaped table of FIG. 1.

An offset T-arrangement is shown at 98 of FIG. 1, and with particularity in the view of FIG. 1A. As shown, the arrangement 98 includes an intermediate section AA which has been prefabricated using the apparatus of this invention. Section AA comprises a straight pipe or tube member 43m terminating at and pre-welded at opposite ends to 45° elbow members 41a and 41b, respectively. The prefabricating procedure, although not specifically shown, and the alignment and welding of members 41a, 43m and 41b of the intermediate section AA for prefabrication, may be accomplished with various supplementary fixtures as previously described, and also with a 45° mandrel support 113, as will be later described in connection with the horizontally positioned arrangement at the left of FIG. 2.

Returning to alignment and support procedures required for assembly of the offset T-arrangement of FIG. 1A, it will be observed that the straight pipe sections 43 forming the perpendicular "bar" of the T-arrangement are supported at their respective free ends by the mandrels 26 of the end support members 19 located and secured in place in the tracks of respectable table extensions 10A and 10B. The inner ends of pipe members 43 of the "bar" are arranged to register with and confront the tee-fitting 61 (see similar arrangement 60 of FIG. 1). The T-portion of the arrangement 98 is aligned and secured in place as previously described in connection with the arrangement 60 and utilizing the supplementary elbow or T-holder 65.

The offset T-arrangement 98 of FIG. 1A utilizes the intermediate section AA as a riser and is supported above the table extension 10C by means of a relatively short V-block member 63. The riser prefabricated intermediate section AA is supported at the free end of pipe or tubular member 43 disposed above table extension 10C and terminates at its opposite end in the mandrel 26 of end support member 19 located in the tracks 20 and 21 of table extension 10C.

With respect to FIG. 2, it will be observed that the arrangement 99 containing a combination of a 90° elbow at 101 and a 45° elbow 102, may be accommodated for welding as shown at the right of FIG. 2. The table extension 10B supports an end support 19 including an upright 25 arranged to receive a vertically adjustable V-block 100 slideably received in the T-slot of the upright 25. This V-block 100 provides a vertical support for the pipe or tube member 43 and its confronting 90° elbow fitting 101, whereas the horizontal pipe portion 43 adjacent to the opposite end of the 90° elbow 101 is supported by means of a freely slideable V-block 90, and terminates at its opposite end into a confronting 45° elbow fitting 102. The fitting 102 is supported by means of an elbow holder 105 slotted to receive vertically adjustable clamping members 106 and 107 having retaining thumb screws 108 and 109, respectively. The upper and lower clamping members 106 and 107 contain details (not shown) for sliding engagement in T slots (not shown) disposed in a longitudinal opening 110 of the elbow holder 105. The clamping members 106 and 107 each include central notches 104 for frictional engagement with the outer surface of the elbow fitting 102. A pipe section 43 extends angularly, in a horizontal plane, from the 45° elbow 102 and is received by a mandrel 26 extending from a 45° pipe mandrel support 113. This support 113 has oppositely disposed 45° faces 114 and 115 for supporting a mandrel 26, depending upon the desired angular direction of the pipe 43. An upright 25, as described in connection with FIGS. 4 and 5, and its clamp member 53 is used as an universal support member and remains the same configuration for each of its uses. A conventional hand clamp 103 may be used to releaseably secure the upstanding pipe section 43 to the vertical V-block 100.

Another arrangement 118 is shown at the opposite side of the table extension 10C and also supported at its opposite end at table extension 10A. The 45° fixture is not shown for this 45° bend, but it will be obvious that a left-hand holder fixture 105 may also be used for this support.

FIG. 1 also discloses a combination 90° elbow arrangement 120 including an intermediate transition member 121 shown for joining one diameter pipe 43 to a larger diameter pipe 43a.

Figure 10:
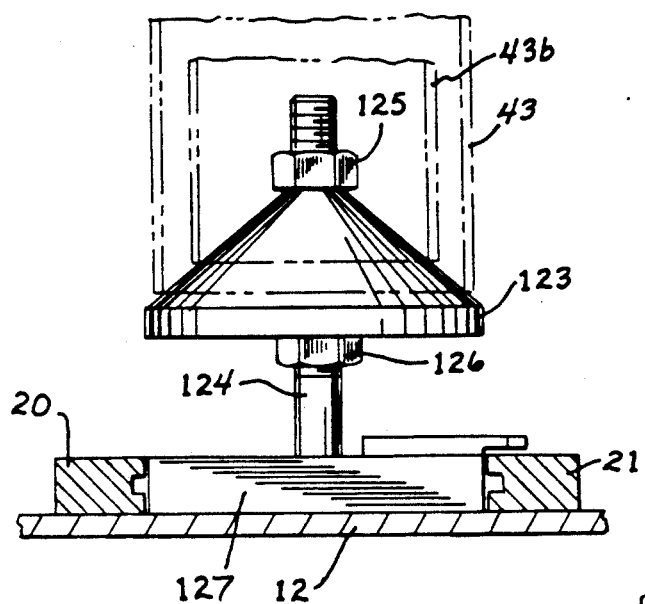
FIG. 10 is a front elevational view, partially in section, of a conical shaped mandrel for universal use in supporting pipes or other tubular members of varying cross-sectional dimension.

A T-manifold arrangement is indicated by reference numeral 122. This arrangement illustrates the previously described tee-joint with several relatively small tubular or pipe members 43b extending from a pipe or tubular member 43. Although not specifically shown, the fixture for retaining or supporting the relatively small diameter manifold pipes or tubes 43b may be in the form of a conical fixture 123, as disclosed in FIGS. 10 and 13. The supporting cone 123 may be vertically adjusted by means of a threaded supporting center post 124, including securing backup nuts 125 and 126. Preferably, the cone 123 should be threaded to engage the threaded support center post 124, and may be rotated to the desired vertical position and locked in place by means of the abutting nuts 125 and 126. Pipe or tubing of varying diameters may be accommodated by the cone as shown in phantom lines 43b and 43 (FIG. 10). A free sliding base 127 is provided and is arranged to be supported on the supporting base 12. It will be apparent that the universally adaptable, supplementary conical fixture 123 may be inverted on the support post 124, or substituted for the mandrel 26 to fit other than conventional pipe diameters and fittings, in any available angular, vertical, horizontal position, either upright FIG. 3) or inverted (not specifically shown).

Figure 12:
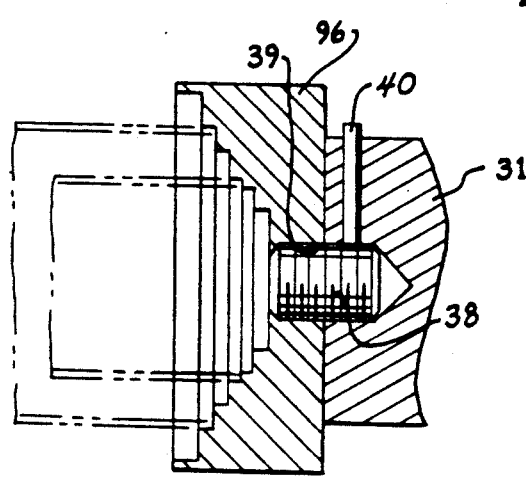
FIG. 12 is a longitudinal sectional view of a modified mandrel having stepped internal diameter sections for receiving pipe or tubing of varying outer diameters.

A ferrule arrangement 130 is also disclosed at FIG. 1. Here, a pipe section 43 is fastened at its opposite ends to ferrules 131. Although not specifically shown, one of the internal stepped diameters of the female mandrel 96 disclosed at FIG. 12 may be used to retain the individual ferrules 131 during welding. The female mandrel 96 may be supported on the end support upright 25 as illustrated in FIG. 12.

Figure 11:
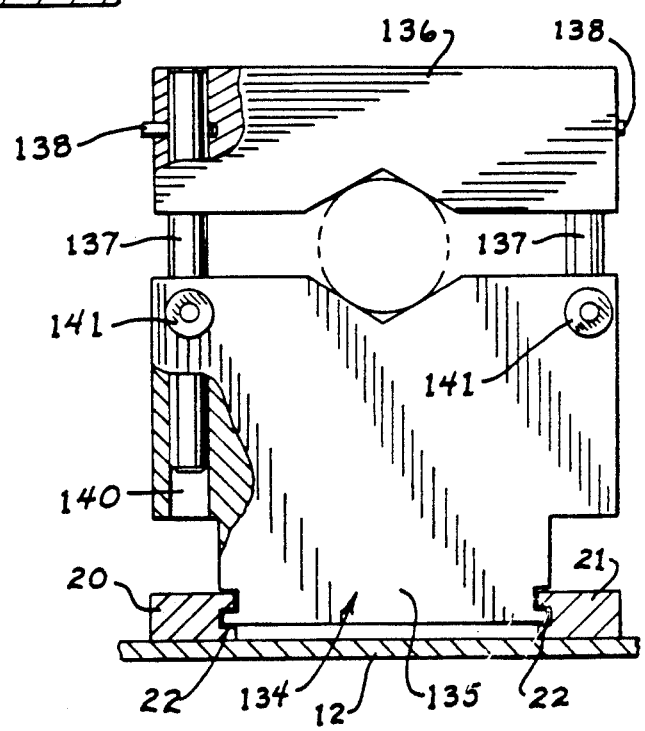
FIG. 11 is an elevational view, partly in section, of a supplementary fixture which may be supported in the slotted tracks of the supporting table and adapted for retention of pipe or tubing of varying sizes.

Modifications may be made to various auxiliary or supplementary fixtures. For example, with reference to FIG. 11, there is shown an adjustable clamping holder 134 including upper and lower V-block 135 and 136. As shown in FIG. 3, this holder 134 is used to minimize distortion of relatively long lengths of pipes 43. The lower V-block 135 is arranged at its lower end to be received by the opposed slots 22 of tracks 20 and 21, and is slideable in the tracks to the desired position. An upper V-block 136 is fastened to oppositely positioned, parallel posts 137 by means of pins 138. The posts 137 are arranged to be slideably received in vertical openings 140 and retained in place by means of a thumb screw 141 after desired vertical positioning is determined.

The supplementary nozzle support fixture 145 of FIGS. 8 and 9 has particular application in supporting a 90° arrangement (not specifically shown) for welding nozzles of small diameter to a pipe or tube. The nozzle support fixture 145 includes a base member 146 having outwardly projecting tongues 147 arranged for slideable retention in grooves 22 of the tracks 20 and 21. The base member 146 supports a pair of uprights 148 from which extend a nozzle supporter V-block 149. The V-block 149 is centrally supported from a horizontal bar 150 having opposite ends embracing the uprights 148 and is retained in a desired vertical position by means of thumb screws 151 abutting respectively to uprights 148. As shown in phantom lines, the V-block 149 is arranged to vertically support a nozzle 152.

It will be apparent from the foregoing description that a very versatile pipe welding apparatus has been presented, and which is adaptable for receipt of a variety of supplementary support fixtures. Setup of confronting pipe or tube members to be welded, and which may include members of the same or varying sizes, may be faciley accomplished in a minimum amount of time. All members are correctly aligned and tightly supported and retained for maximum and very acceptable welding techniques without requiring any modifications whatsoever of conventional welding equipment, such as those using conventional orbital welding heads.

I claim:

1. Apparatus for aligning and supporting first and second tubular members prepatory to and during welding of confronting free ends of said tubular members, and wherein said first tubular member includes a second free end, said apparatus comprising:
   (a) a stationary supporting base;
   (b) an end support member for said first tubular member;
   (c) a cantilevered mandrel supported from said end support member and having a free end adapted to releaseably receive and support the said second free end of said first tubular member;
   (d) adjustment means for adjusting the height vertical position of said mandrel relative to said stationary supporting base; and
   (e) means for releaseably securing said end support member to said stationary supporting base.

2. The apparatus of claim 1, wherein said stationary supporting base includes a pair of parallel tracks and said end support member being supported by and releaseably engageable with said tracks at a predetermined position relative to said first tubular member and to said tracks.

3. The apparatus of claim 2, wherein said tracks each include longitudinal grooves in respective oppositely facing relationship and said end support member includes laterally extending tongue portions slideably received in said grooves.

4. The apparatus of claim 2, wherein at least one of said tracks contains a ruler along at least a portion of its length.

5. The apparatus of claim 1, wherein said means for releaseably securing the end support member to said supporting base comprises a releaseable clamping means located at the side opposite said mandrel and having a pad member for frictionally engaging the supporting base.

6. The apparatus of claim 1, wherein said mandrel has a diameter substantially identical with the outer diameter of said first tubular member.

7. The apparatus of claim 6, wherein the free end of said mandrel includes at least one annular shoulder defining a distal end portion of relatively reduced diameter.

8. The apparatus of claim 1, wherein the cantilevered mandrel is removeably supported at one end by a mandrel base member projecting horizontally from said end support member.

9. The apparatus of claim 1, wherein said end support member includes a vertical upright defining a T-slot, a horizontally projecting base member for supporting said mandrel including oppositely extending tongue portions slideably engaging said T-slot for vertical movement of said mandrel and means for elevating said base member and said mandrel to a predetermined vertical position relative to said supporting base.

10. The apparatus of claim 9, wherein said elevating means comprises a manually operated screw supported at opposite ends by said vertical upright and threadingly engaging a threaded aperture in said mandrel base.

11. The apparatus of claim 1, wherein said mandrel includes an internal cavity at the free end thereof and wherein said cavity is provided with at least one internal annular shoulder defining a ledge of relatively reduced diameter.

12. In the apparatus of claim 1, a secondary support member comprising a cantilevered extension for supporting an angularly bent tubular fitting and an arcuate clamping pad, said clamping pad and said cantilevered extension arranged to retain said angularly bent tubular fitting therebetween, and adjustment means for adjusting the height and horizontal position of said tubular fitting relative to said supporting base.

13. In the apparatus of claim 1, a secondary support member comprising a conically formed mandrel having its conical surface arranged for support of a free end of a tubular member of an internal diameter varying from the internal diameter of said first tubular member.

14. In the apparatus of claim 1, a secondary support member comprising a free sliding V-block for support of a respective tubular member intermediate its ends.

15. In the apparatus of claim 1, a secondary support member comprising a cantilevered multi-faced mandrel base support member arranged to receive and releaseably support a mandrel at a preselected angular position relative to said stationary supporting base.

16. In the apparatus of claim 1, a secondary support member comprising a V-grooved block mounted on said mandrel base support and having the axis of the V-groove disposed in a vertical plane and arranged for end support of one end of a 90° tubular fitting and clamping means for retaining said 90° fitting in vertical alignment with said V-groove.

17. In the apparatus of claim 1, a secondary support member including a clamping member releaseably secured to said stationary supporting base and having two vertically disposed parallel apertures and an upper clamping member having parallel rod members slideably received by said respective parallel apertures and manually operated locking means for locking said upper clamping member in a preselected vertical position relative to said lower clamping member, at least one of said clamping members being grooved to receive and support a tubular member.

18. In the apparatus of claim 1, a dimension indicator comprising a pointer, an upright member, means for adjustably positioning and temporarily securing and vertically and horizontally adjusting said pointer relative to said upright member, and means for horizontally adjustably positioning and temporarily securing said upright relative to said stationary supporting base.

19. Apparatus for aligning and supporting first and second tubular members prepatory to and during welding of confronting ends of said tubular members, and wherein said first tubular member includes a free end, said apparatus comprising:
 (a) an elongated table having an angularly disposed table extension, said table and said table extension each having an upper surface defining a stationary supporting base;
 (b) a pair of parallel tracks supported on said respective upper surfaces.
 (c) an auxiliary table disposed at the junction of said table and said angularly disposed table extension and arranged to support an intermediate support member said end support member including cantilevered means for supporting an angularly bent tubular fitting positioned intermediate the ends of said first and second tubular members;
 (d) an end support member supported by said tracks and including means for supporting the said free end of said first tubular member; and
 (e) means for releaseably securing said end support member at a predetermined position relative to and on said track.

20. The apparatus of claim 19, wherein said auxiliary table includes radially speed end support retaining means for predetermined angular positioning of said end support relative to said table and to said angularly extending table extension.

21. The apparatus of claim 20, wherein the said retaining means comprises radially spaced apertures arranged to receive fasteners for releaseable securement of said end support in one of several mounting positions.

22. In the apparatus of claim 19, a dimension indicator comprising a pointer, an upright member, means for adjustably positioning and temporarily securing and vertically and horizontally adjusting said pointer relative to said upright member, and means for horizontally adjustably positioning and temporarily securing said upright relative to said stationary supporting base.

* * * * *